US012142877B2

(12) United States Patent
Takahashi et al.

(10) Patent No.: US 12,142,877 B2
(45) Date of Patent: Nov. 12, 2024

(54) SHIELD STRUCTURE AND WIRING HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Keigo Takahashi, Mie (JP); Hiroki Takagi, Mie (JP); Masami Sakai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 460 days.

(21) Appl. No.: 17/434,995

(22) PCT Filed: Feb. 18, 2020

(86) PCT No.: PCT/JP2020/006187
§ 371 (c)(1),
(2) Date: Aug. 30, 2021

(87) PCT Pub. No.: WO2020/179430
PCT Pub. Date: Sep. 10, 2020

(65) Prior Publication Data

US 2022/0140538 A1 May 5, 2022

(30) Foreign Application Priority Data

Mar. 7, 2019 (JP) ................................ 2019-041267

(51) Int. Cl.
*H01R 13/6581* (2011.01)
*H01B 7/00* (2006.01)
*H01R 13/6591* (2011.01)

(52) U.S. Cl.
CPC ....... *H01R 13/6581* (2013.01); *H01B 7/0045* (2013.01); *H01R 13/6591* (2013.01)

(58) Field of Classification Search
CPC .............. H01R 13/648; H01R 13/6581; H01R 13/6591; H01R 13/6592; H01R 13/65915; B60R 6/0215; H01B 7/0045
See application file for complete search history.

(56) References Cited

U.S. PATENT DOCUMENTS 3,986,762 A * 10/1976 Reeder .................. H01R 27/00 439/218
5,487,682 A 1/1996 Miller et al.
(Continued)

FOREIGN PATENT DOCUMENTS

JP 2004-079377 A 3/2004
JP 2015-053194 A 3/2015

OTHER PUBLICATIONS

International Search Report issued on Apr. 14, 2020 for WO 2020/179430 A1 (4 pages).

*Primary Examiner* — Paresh Paghadal
(74) *Attorney, Agent, or Firm* — Venjuris, P.C.

(57) ABSTRACT

A shield structure includes a twisted pair cable formed by twisting two wires and including a parallel portion, the two wires being arranged side by side in the parallel portion, and a shield member including two conductive side wall portions disposed around the parallel portion and two connecting portions configured to connect the two side wall portions. The two connecting portions are respectively disposed on
(Continued)

front end parts and rear end parts in an extending direction of the parallel portion, out of the two side wall portions.

6 Claims, 15 Drawing Sheets

(56) References Cited

U.S. PATENT DOCUMENTS

| | | | | |
|---|---|---|---|---|
| 8,079,870 | B2 * | 12/2011 | Nakamura ........... | H01R 9/0518 439/585 |
| 8,348,699 | B2 | 1/2013 | Nagawatari et al. | |
| 8,523,610 | B2 * | 9/2013 | Kuster ................... | H01R 27/00 439/607.01 |
| 2002/0155757 | A1 * | 10/2002 | Yoshioka ......... | H01R 13/65915 439/607.01 |
| 2014/0017926 | A1 | 1/2014 | Wu et al. | |
| 2017/0256892 | A1 | 9/2017 | Maesoba et al. | |
| 2019/0013614 | A1 | 1/2019 | Matsui et al. | |

* cited by examiner

SHIELD STRUCTURE AND WIRING HARNESS

CROSS REFERENCE TO RELATED APPLICATIONS

This application is a national phase of PCT application No. PCT/JP2020/006187, filed on 18 Feb. 2020, which claims priority from Japanese patent application No. 2019-041267, filed on 7 Mar. 2019, all of which are incorporated herein by reference.

TECHNICAL FIELD

The present disclosure relates to a shield structure and a wiring harness.

BACKGROUND

Conventionally, a twisted pair cable formed by twisting two wires is known (Japanese Patent Laid-Open Publication No. 2012-018898). The twisted two wires are untwisted in an end part of the twisted pair cable, and the two wires are disposed side by side.

PRIOR ART DOCUMENT

Patent Document

Patent Document 1: JP 2012-018898 A

SUMMARY OF THE INVENTION

Problems to be Solved

In the conventional art, the two wires disposed side by side are covered in a vertical direction and a lateral direction by a shield member made of metal due to a concern that noise is mixed from a part where the two wires are disposed side by side.

Since the above shield member covers the two wires disposed side by side in the vertical and lateral directions, the structure thereof tends to be complicated and weight saving is difficult.

The present disclosure was completed on the basis of the above situation and aims to provide a shield structure and a wiring harness solving at least one of structure simplification, weight saving and noise resistance performance improvement.

Means to Solve the Problem

The present disclosure is directed to a shield structure with a twisted pair cable formed by twisting two wires and including a parallel portion, the two wires being arranged side by side in the parallel portion, and a shield member including two conductive side wall portions disposed around the parallel portion and two connecting portions configured to electrically connect the two side wall portions, the two connecting portions being respectively disposed on front end parts and rear end parts in an extending direction of the parallel portion, out of the two side wall portions.

The present disclosure is also directed to a wiring harness with a twisted pair cable formed by twisting two wires and including a parallel portion, the two wires being arranged side by side in the parallel portion, two terminals respectively connected to end parts of the two wires constituting the parallel portion, a connector configured to accommodate the two terminals, and a shield member including two conductive side wall portions disposed around the parallel portion and two connecting portions configured to electrically connect the two side wall portions, the two connecting portions being respectively disposed on front end parts and rear end parts in an extending direction of the parallel portion, out of the two side wall portions.

Effect of the Invention

According to the present disclosure, at least one of effects of structure simplification, weight saving and noise resistance performance improvement can be obtained for a technique relating to a shield structure.

DETAILED DESCRIPTION TO EXECUTE THE INVENTION

Description of Embodiments of Present Disclosure

Figure 1:
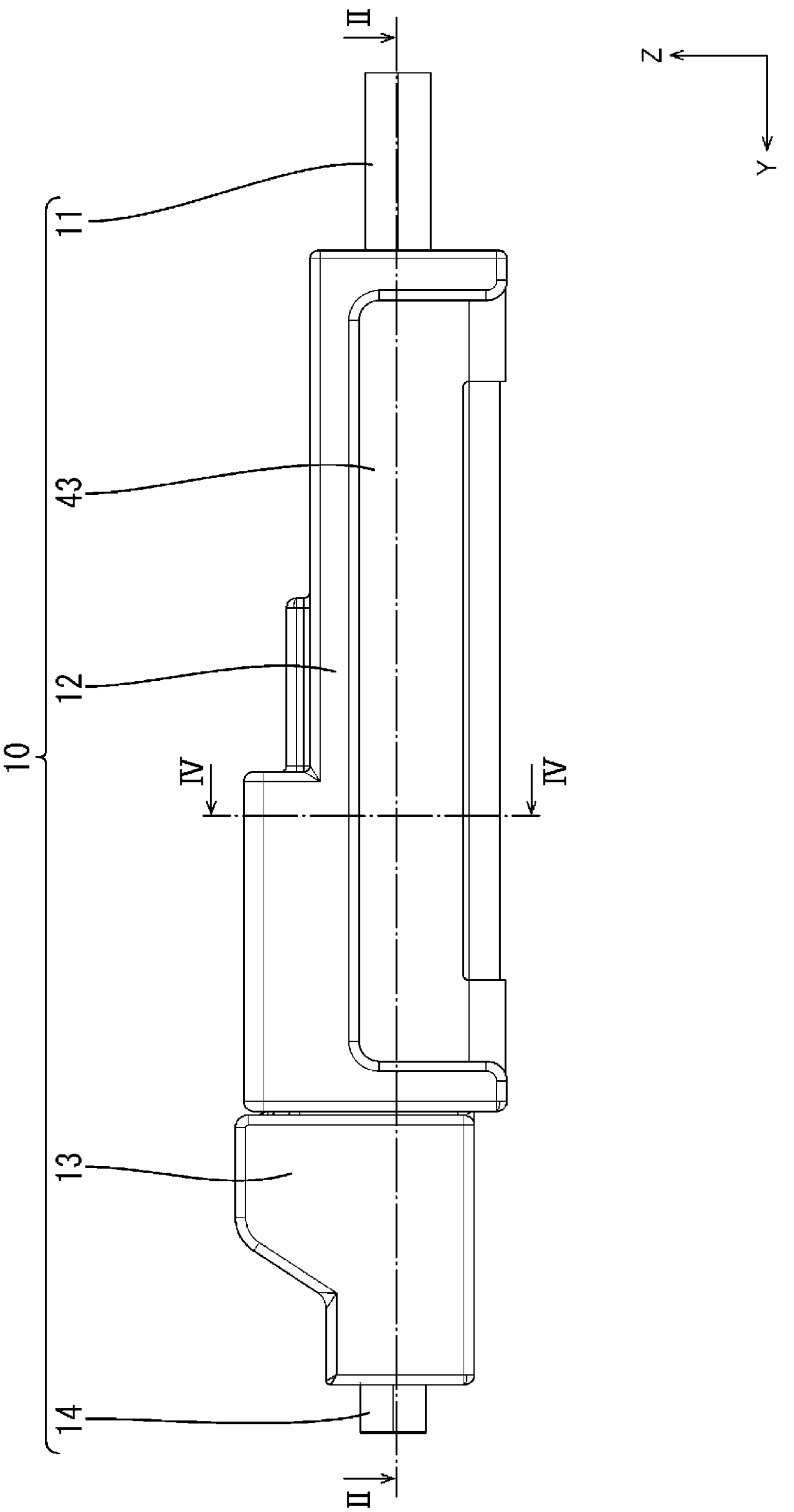
FIG. 1 is a side view showing a wiring harness according to a first embodiment.

Embodiments of the present disclosure are listed and described.

(1) The shield structure of the present disclosure includes a twisted pair cable formed by twisting two wires and including a parallel portion, the two wires being arranged side by side in the parallel portion, and a shield member including two conductive side wall portions disposed around the parallel portion and two connecting portions configured to electrically connect the two side wall portions, the two connecting portions being respectively disposed on front end parts and rear end parts in an extending direction of the parallel portion, out of the two side wall portions.

According to the above configuration, the two wires arranged side by side in the parallel portion are electromagnetically shielded from a noise source located around the side wall portions by the side wall portions disposed around the parallel portion. In this way, the noise resistance performance of the twisted pair cable can be improved.

(2) An opening is provided between the two connecting portions.

According to the shield member disclosed in this specification, since the opening is formed between the two connecting portions, the structure of the shield member can be simplified. In this way, the shield member can be reduced in weight. Further, the manufacturing cost of the shield member can be reduced. Further, the two wires constituting the parallel portion are exposed from this opening. If the noise source is disposed in a region where the two wires constituting the parallel portion are exposed, a reduction in the noise resistance performance of the twisted pair cable can be suppressed for the following reason. If the noise source is disposed in the region where the two wires constituting the parallel portion are exposed, noise emitted from the noise source affects both of the two wires. Since the noise given to both of the two wires is cancelled in a differential communication cable, a reduction in the noise resistance performance of the twisted pair cable can be suppressed.

(3) Preferably, the two side wall portions are mirror-symmetrically formed with respect to a virtual plane including a middle position between the two wires constituting the parallel portion and extending along an extending direction of the two wires.

According to the above configuration, an electromagnetic environment of the two wires constituting the parallel portion can be homogenized. In this way, the influence of noise emitted from the noise source on the two wires can be homogenized as compared to the case where the shield member is not provided.

(4) Preferably, the connecting portions are integrally formed to the two side wall portions.

According to the above configuration, since the structure of the shield member can be simplified, the manufacturing cost of the shield member can be reduced.

(5) Preferably, the two side wall portions are located around two terminals connected to respective end parts of the two wires constituting the parallel portion.

According to the above configuration, the influence of the noise given to the terminals connected to the end parts of the two signal wires can be reduced.

(6) Preferably, parts of the two wires exposed from an end part of a sheath collectively surrounding the two wires constitute the parallel portion, and the connecting portions include externally fitting portions externally fit to the end part of the sheath and extending portions extending from the externally fitting portions and configured to contact the two side wall portions.

According to the above configuration, the untwisting of the two wires located in the sheath can be suppressed by externally fitting the externally fitting portions to the end part of the sheath.

Further, since a member for suppressing the untwisting of the two wires disposed in the sheath can be used to electrically connect the two side wall portions, the number of components can be reduced. In this way, the manufacturing cost of the shield structure can be reduced.

(7) The wiring harness of the present disclosure includes a twisted pair cable formed by twisting two wires and including a parallel portion, the two wires being arranged side by side in the parallel portion, two terminals respectively connected to end parts of the two wires constituting the parallel portion, a connector configured to accommodate the two terminals, and a shield member including two conductive side wall portions disposed around the parallel portion and two connecting portions configured to electrically connect the two side wall portions, the two connecting portions being respectively disposed on front end parts and rear end parts in an extending direction of the parallel portion, out of the two side wall portions.

According to the above configuration, the noise resistance performance of the wiring harness can be improved.

(8) Preferably, the connector includes a fixing portion, the shield member being fixed to the fixing portion.

According to the above configuration, the structure of the wiring harness can be simplified as compared to the case where the shield member is fixed to a member different from the connector.

Details of Embodiments of Present Disclosure

Hereinafter, embodiments of the present disclosure are described. The present invention is not limited to these illustrations and is intended to be represented by claims and include all changes in the scope of claims and in the meaning and scope of equivalents.

First Embodiment

A first embodiment in which a technique disclosed in this specification is applied to a wiring harness 10 is described with reference to FIGS. 1 to 17. As shown in FIG. 1, the wiring harness 10 according to this embodiment includes a first UTP (Unshielded Twisted Pair) cable 11 (an example of a twisted pair cable), a male connector 12 (an example of a connector) connected to an end part of the first UTP cable 11, a female connector 13 (an example of the connector) to be connected to the male connector 12 and a second UTP (Unshielded Twisted Pair) cable 14 (an example of the twisted pair cable) having the female connector 13 connected to an end part.

Figure 4:
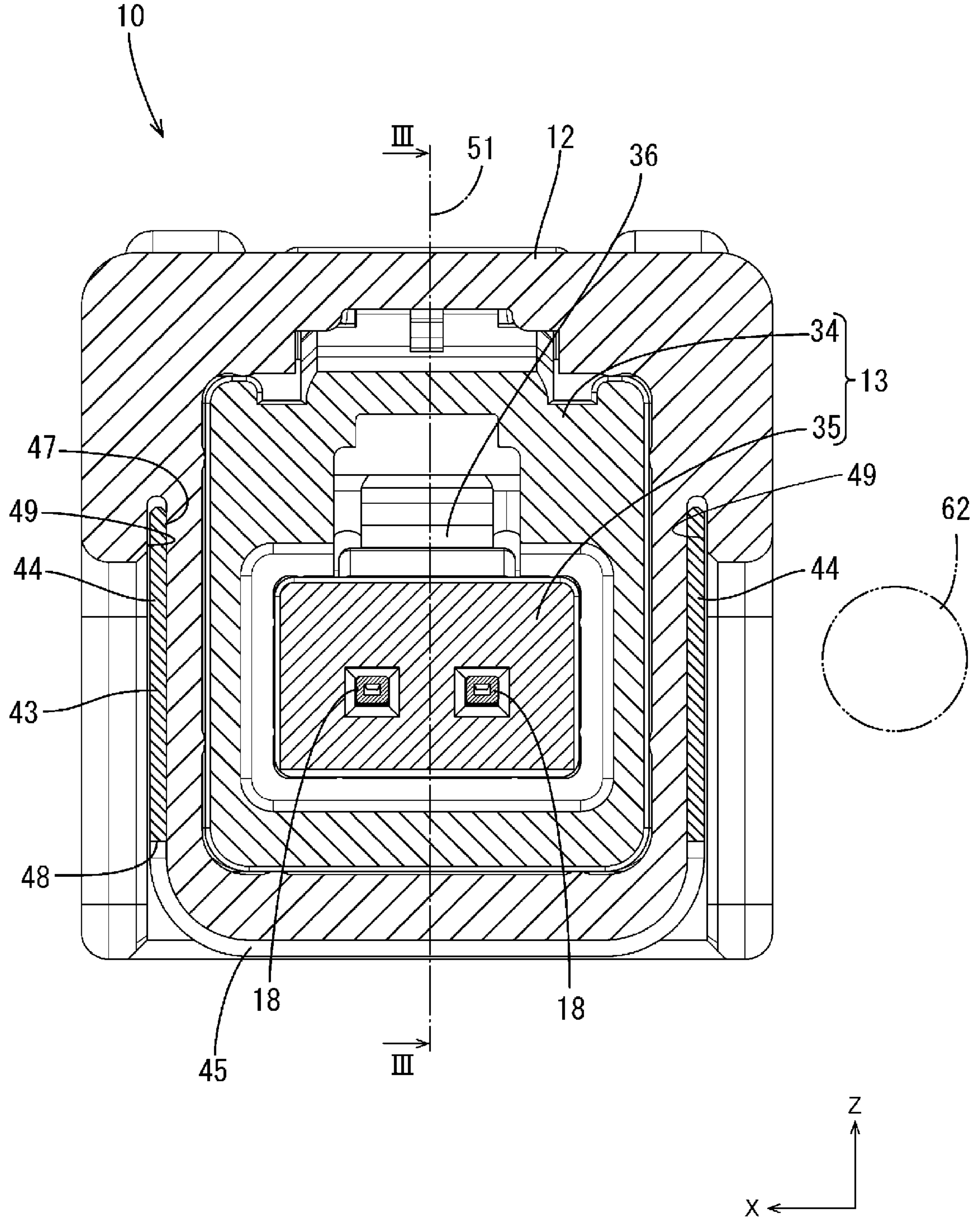
FIG. 4 is a section along IV-IV in FIG. 1.

A wire 62 serving as a noise source is fixed to the wiring harness 10 according to this embodiment by a known method such as taping while being disposed along the wiring harness 10 (see FIG. 4). A power supply wire connected to a device is illustrated as the wire 62 serving as the noise source. Noise may be mixed into such a power supply wire from the connected device.

In the following description, a Z direction is an upward direction, a Y direction is a forward direction and an X direction is a leftward direction. Further, for a plurality of identical members, some members may be denoted by a reference sign, but the other members may not be denoted by the reference sign.

[First UTP Cable 11]

Figure 2:
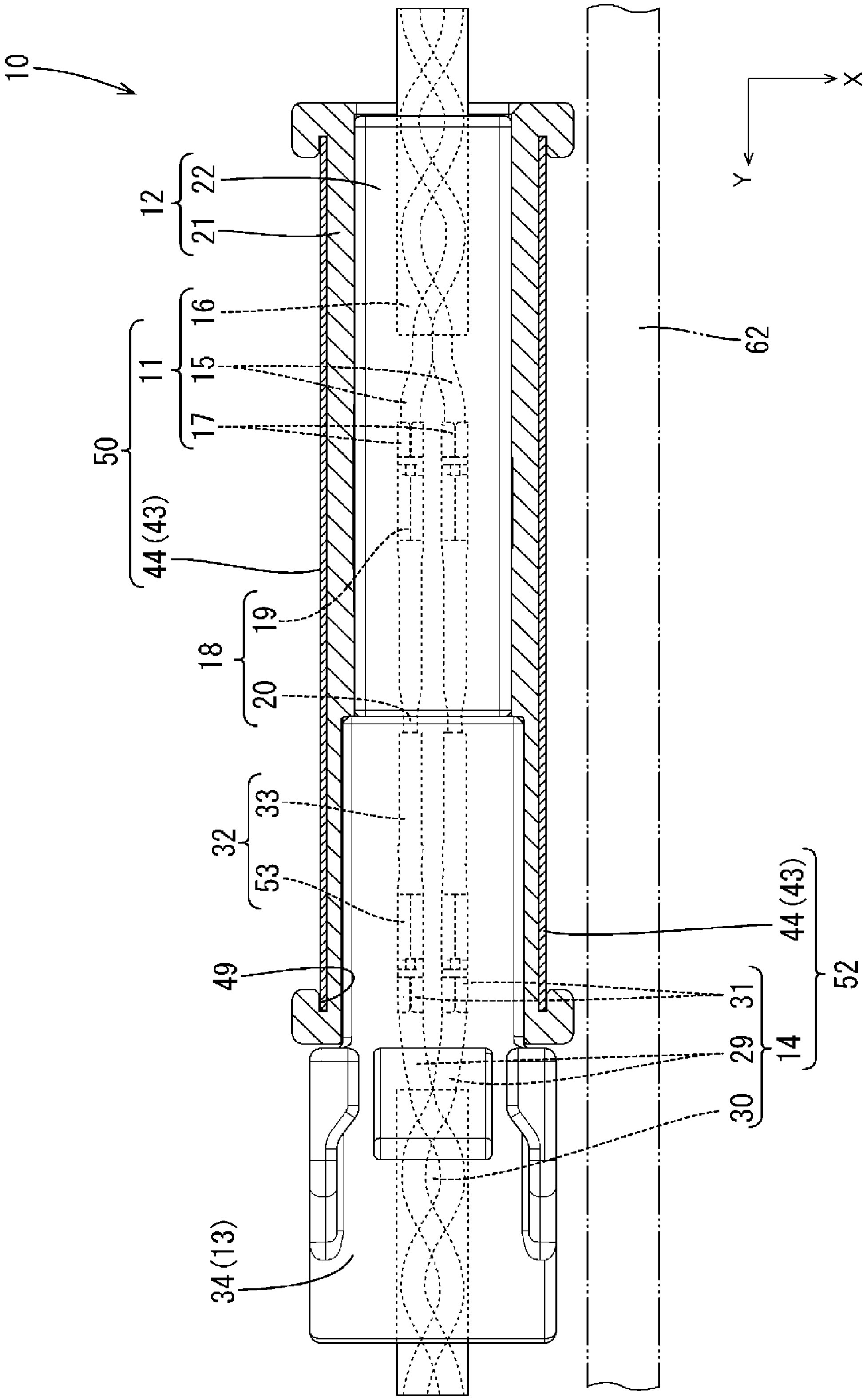
FIG. 2 is a section along II-II in FIG. 1.

As shown in FIG. 2, the first UTP cable 11 is configured such that the outer peripheries of two first wires 15 twisted to each other are collectively surrounded by an insulating first sheath 16. The first wire 15 has such a known configuration that the outer periphery of a conductive core is covered with an insulation coating made of insulating synthetic resin.

The two first wires 15 are drawn out from an end part of the first sheath 16. The two first wires 15 drawn out from the end part of the first sheath 16 are untwisted, extend in a front-rear direction (an example of an extending direction of two wires) and constitute a first parallel portion 17 (an example of a parallel portion) in which the first wires 15 are disposed side by side while being spaced apart in a lateral direction. The two first wires 15 located inside the first sheath 16, out of the first UTP cable 11, are twisted to each other.

An interval in the lateral direction between the two first wires 15 constituting the first parallel portion 17 is narrowest near the end part of the first sheath 16 and becomes wider with distance from the end part of the first sheath 16.

[Male Terminals 18]

Male terminals 18 are respectively connected to end parts of the two first wires 15 constituting the first UTP cable 11. In this way, two male terminals 18 are connected to one first UTP cable 11. The two male terminals 18 have the same shape and size. The male terminal 18 is formed by press-working a metal plate material into a predetermined shape. The male terminal 18 includes a wire connecting portion 19 to be fixed to the first wire 15 by being crimped to the end part of the first wire 15 and electrically connected to the core of the first wire 19, and a male tab 20 connected to the wire connecting portion 19 and extending forward.

[Male Connector 12]

Figure 3:
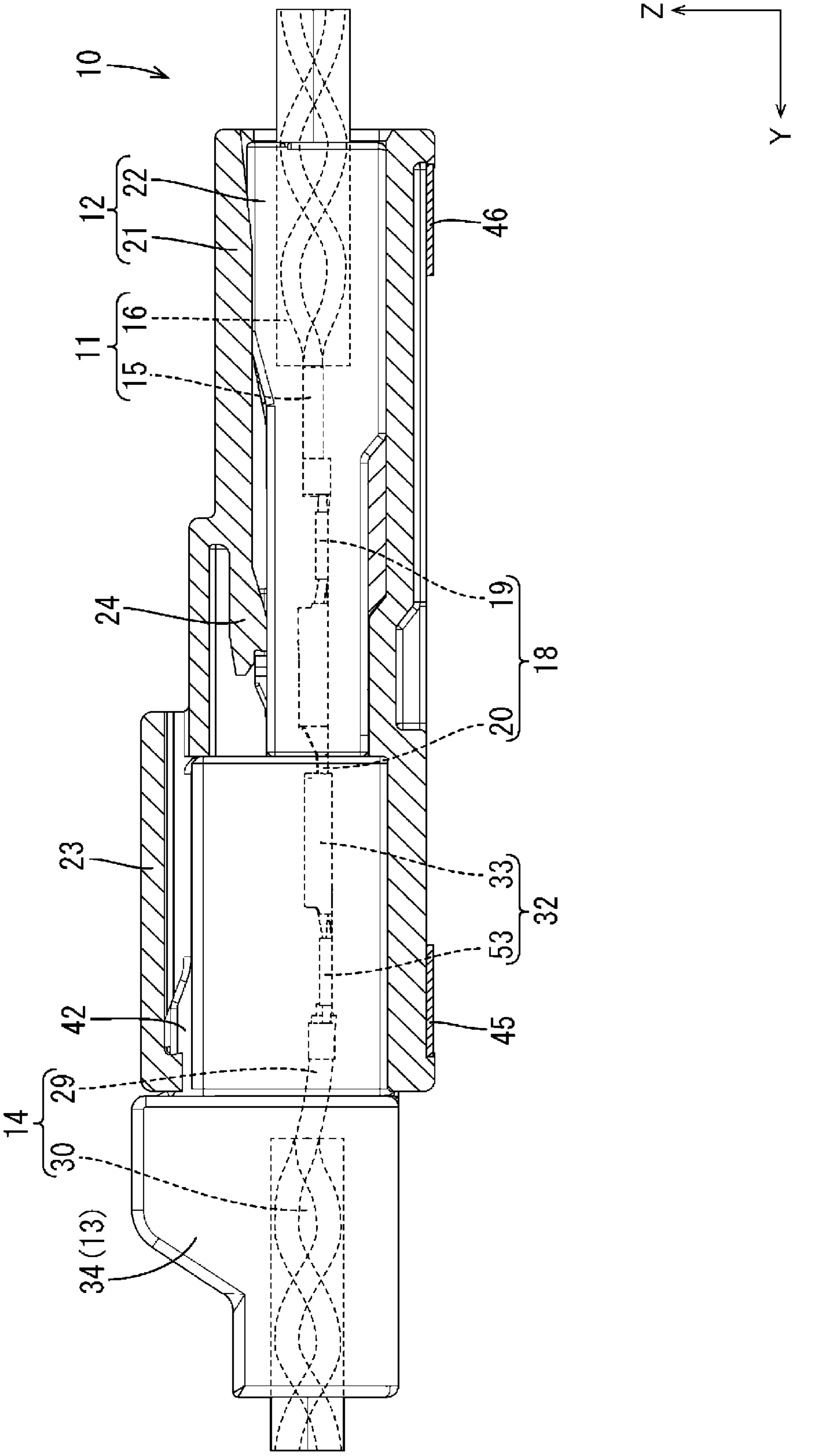
FIG. 3 is a section along III-III in FIG. 4.

As shown in FIG. 3, the male connector 12 includes a male outer housing 21 and a male inner housing 22 to be accommodated inside the male outer housing 21.

The male outer housing 21 includes a receptacle 23 open forward. The female connector 13 is fit into the receptacle 23. The male outer housing 21 is formed by injection-molding an insulating synthetic resin. A male locking lance 24 extending forward is formed inside the male outer housing 21. The male locking lance 24 is resiliently engaged with the male inner housing 22, whereby the male inner housing 22 is retained and held in the male outer housing 21.

The two male terminals 18 are arranged in the male inner housing 22 while being spaced apart in the lateral direction. The male tabs 20 of the male terminals 18 are disposed to extend forward in the receptacle 23.

[Second UTP Cable 14]

As shown in FIG. 2, the second UTP cable 14 is configured such that the outer peripheries of two second wires 29 twisted to each other are collectively surrounded by an insulating second sheath 30. The two second wires 29 drawn out from an end part of the second sheath 30 are untwisted, extend in the front-rear direction (an example of the extending direction of the two wires) and constitute a second parallel portion 31 (an example of the parallel portion) in which the second wires 29 are disposed side by side while being spaced apart in the lateral direction. An interval in the lateral direction between the two second wires 29 constituting the second parallel portion 31 is narrowest near the end part of the second sheath 30 and becomes wider with distance from the end part of the second sheath 30. Since the configuration of the second UTP cable 14 is the same as that of the first UTP cable 11, repeated description is omitted.

[Female Terminals 32]

Female terminals 32 are respectively connected to end parts of the two second wires 29 constituting the second UTP cable 14. In this way, two female terminals 32 are connected to one second UTP cable 14. The two female terminals 32 have the same shape and size. The female terminal 32 is formed by press-working a metal plate material into a predetermined shape. The female terminal 32 includes a wire connecting portion 53 to be fixed to the second wire 29 by being crimped to the end part of the second wire 29 and electrically connected to a core of the second wire 29 and a connecting tube portion 33 connected to the wire connecting portion 53 and extending rearward. The male tab 20 of the male terminal 18 is insertable into the connecting tube portion 33. A resiliently deformable resilient contact piece (not shown) is disposed inside the connecting tube portion 33. By the resilient contact of the resilient contact piece with the male tab 20, the female terminal 32 and the male terminal 18 are electrically connected.

[Female Connector 13]

As shown in FIG. 3, a rear half of the female connector 13 is fit into the receptacle 23 of the male connector 12 from behind. With the male connector 12 and the female connector 13 connected, a front half of the female connector 13 is located in front of the receptacle 23. As shown in FIG. 4, the female connector 13 includes a female outer housing 34 and a female inner housing 35 to be accommodated inside the female outer housing 34.

The female outer housing 34 is formed by injection-molding an insulating synthetic resin. A female locking lance 36 extending rearward is formed inside the female outer housing 34. The female locking lance 36 is resiliently engaged with the female inner housing 35, whereby the female inner housing 35 is retained and held in the female outer housing 34.

The female terminals 32 are held in the female inner housing 35. The two female terminals 32 are arranged side by side in the female inner housing 35 while being spaced apart in the lateral direction.

With the female connector 13 fit in the receptacle 23 of the male connector 12, a lock portion 42 formed in the female connector 13 is locked to the male connector 12, whereby the female connector 13 is retained and held in the receptacle 32.

[Shield Member 43]

Figure 5:
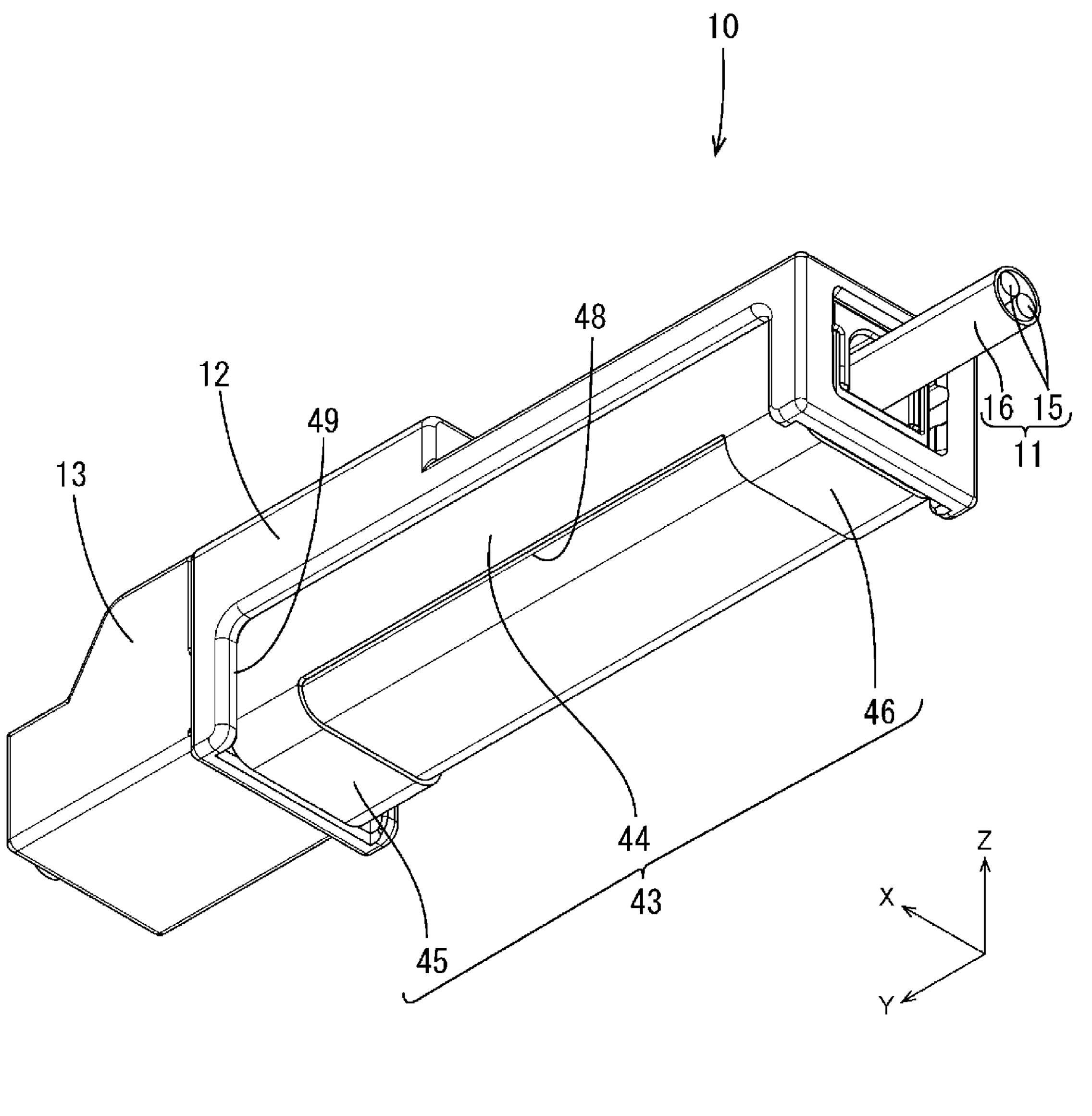
FIG. 5 is a perspective view showing the wiring harness.
Figure 6:
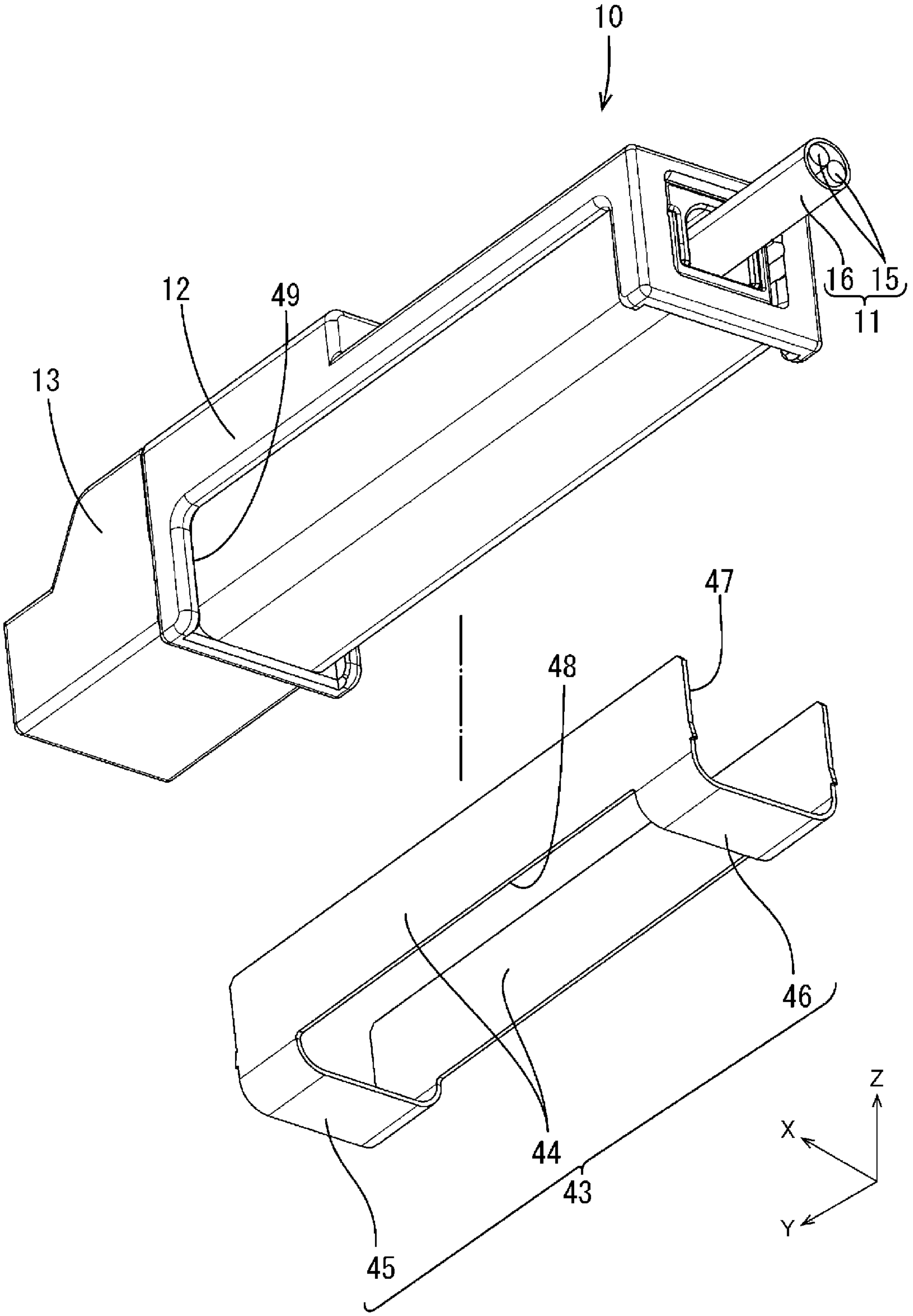
FIG. 6 is an exploded perspective view of the wiring harness showing a state where a shield member is separated from a male connector.

As shown in FIGS. 5 and 6, the shield member 43 is formed by press-working a conductive metal plate material into a predetermined shape. An arbitrary metal such as copper, copper alloy, aluminum or aluminum alloy can be appropriately selected as the metal constituting the shield member 43. A plating layer made of metal may be formed on the surface of the shield member 43. An arbitrary metal such as tin or nickel can be appropriately selected as the metal constituting the plating layer.

The shield member 43 includes two side wall portions 44, and a front connecting portion 45 (an example of a connecting portion) and a rear connecting portion 46 (an example of the connecting portion) coupling the two side wall portions 44. The two side wall portions 44 have the same shape and size and are formed of rectangular metal plate materials. The two side wall portions 44 are so arranged to rise in the vertical direction that wall surfaces thereof are parallel. Parallel means a case where the wall surfaces of the two side wall portions 44 are parallel and a case where these wall surfaces are not parallel, but can be confirmed to be substantially parallel.

The lower edges of front end parts of the two side wall portions 44 are connected by the front connecting portion 45, and the lower edges of rear end parts of the two side wall portions 44 are connected by the rear connecting portion 46. The two side wall portions 44 are electrically connected by the front and rear connecting portions 45, 46.

Upper edge parts of the two side wall portions 44 constitute an upper opening 47 (an example of an opening) open upward. The entire upper surface of the shield member 43 is open. Further, a region surrounded by lower edge parts of the two side wall portions 44, a rear edge part of the front connecting portion 45 and a front edge part of the rear connecting portion 46 constitutes a lower opening 48 open downward.

As shown in FIG. 4, fitting grooves 49 (an example of a fixing portion) open downward are formed in the left and right side walls of the male outer housing 21. The side wall portions 44 are inserted into the fitting grooves 49. The connecting portions of the shield member 43 are disposed along the lower surface of the lower wall of the male outer housing 21. Note that the shield member 43 is fixed to the male connector 12 by an arbitrary means such as press-fitting, screwing, riveting, bonding, fusion or a holding structure by a lock claw.

[Shield Structures 50, 52]

The shield structure 50 for the male connector 12 shown in FIG. 2 is described. The two side wall portions 44 of the shield member 43 mounted on the male connector 12 are disposed around (outer positions in the lateral direction) the first parallel portion 17 of the first wires 15 constituting the first UTP cable 11. In this way, the first parallel portion 17 of the first wires 15 constituting the first UTP cable 11 is electromagnetically shielded from the noise source located around the side wall portions 44.

Further, the two side wall portions 44 of the shield member 43 are disposed around (outer positions in the lateral direction) the male terminals 18 connected to the end parts of the first wires 15 constituting the first UTP cable 11. In this way, the male terminals 18 are electromagnetically shielded from the noise source located around the side wall portions 44.

In the male connector 12, the first parallel portion 17 of the first wires 15 constituting the first UTP cable 11 and the male terminals 18 connected to an end part of the first parallel portion 17 are located inside the two side wall portions 44 in the front-rear direction.

The two side wall portions 44 are mirror-symmetrically formed with respect to a virtual plane 51 including a middle position between the two first wires 15 constituting the first parallel portion 17 in the lateral direction and extending in the front-rear direction. That is, the two side wall portions 44 are bilaterally symmetrically disposed with respect to the virtual plane 51. In this way, an electromagnetic environment of the first parallel portion 17 of the first wires 15 and the male terminals 18 is homogenized in the lateral direction.

The first parallel portion 17 of the first wires 15 and the male terminals 18 are disposed near a center in a height direction of the two side wall portions 44 in the vertical direction. In this way, the electromagnetic environment of the first parallel portion 17 of the first wires 15 and the male terminals 18 is homogenized in the vertical direction.

The shield structure 52 for the female connector 13 is described. With the female connector 13 and the male connector 12 connected, the two side wall portions 44 are located around (outer positions in the lateral direction) a part of the female connector 13 located in the receptacle 23 of the male connector 12. In particular, the two side wall portions 44 are located around (outer positions in the lateral direction) the part, to which the wire connecting portions 53 of the female terminals 32 are crimped, out of the second parallel portion 31 of the second wires 29 constituting the second UTP cable 14. In this way, the second parallel portion 31 of the second wires 29 constituting the second UTP cable 14 is electromagnetically shielded from the noise source located around the side wall portions 44.

Further, the two side wall portions 44 of the shield member 43 are disposed around (outer positions in the lateral direction) the female terminals 32 connected to the end parts of the second wires 29. In this way, the female terminals 32 are electromagnetically shielded from the noise source located around the side wall portions 44.

In the female connector 13, a part of the second parallel portion 31 of the second wires 29, to which the wire connecting portions 53 of the female terminals 32 are crimped, and the female terminals 32 connected to an end part of the second parallel portion 31 are located inside the two side wall portions 44 in the front-rear direction.

With the male connector 12 and the female connector 13 connected, an interval between the two first wires 15 constituting the first parallel portion 17 in the lateral direction and that between the two second wires 29 constituting the second parallel portion 31 in the lateral direction are equal. The two side wall portions 44 are mirror-symmetrically formed with respect to the virtual plane 51 including a middle position between the two second wires 29 constituting the second parallel portion 31 in the lateral direction and extending in the front-rear direction. That is, the two side wall portions 44 are bilaterally symmetrically disposed with respect to the virtual plane 51. In this way, an electromagnetic environment of the second parallel portion 31 of the second wires 29 and the female terminals 32 is homogenized in the lateral direction.

The first parallel portion 31 of the second wires 29 and the female terminals 32 are disposed near a center in the height direction of the two side wall portions 44 in the vertical direction. In this way, the electromagnetic environment of the second parallel portion 31 of the second wires 29 and the female terminals 32 is homogenized in the vertical direction.

[Example of Manufacturing Process of Embodiment]

Next, an example of a manufacturing process of the embodiment is described. The manufacturing process is not limited to the one described below.

The first sheath 16 is stripped in the end part of the first UTP cable 11. In this way, the two first wires 15 are exposed from the end part of the first sheath 16. The exposed two first wires 15 are untwisted. The male terminal 18 is connected to the end part of each first wire 15.

By performing processings similar to those described above to the second UTP cable 14, the female terminal 32 is connected to the end part of each second wire 29.

The male terminals 18 are accommodated into the male inner housing 22. The male inner housing 22 is assembled with the male outer housing 21 from behind. By locking the male locking lance 24 of the male outer housing 21 to the male inner housing 22 from behind, the male inner housing 22 and the male outer housing 21 are integrally assembled.

By press-working the metal plate material, the shield member 43 is formed. The two side wall portions 44 of the shield member 43 are inserted into the fitting grooves 49 of the male outer housing 21 from below. In this way, the shield member 43 is integrally assembled with the male outer housing 21. In this way, the male connector 12 is formed.

The female terminals 32 are accommodated into the female inner housing 35. The female inner housing 35 is assembled with the female outer housing 34 from front. By locking the female locking lance 36 of the female outer housing 34 to the female inner housing 35, the female inner housing 35 and the female outer housing 34 are integrally assembled. In this way, the female connector 13 is formed.

The female connector 13 is fit into the receptacle 23 of the male connector 12 from front. The lock portion 42 formed in the female connector 13 is resiliently locked to the male connector 12. In this way, the female connector 13 and the male connector 12 are held in a connected state.

Functions and Effects of Embodiment

Next, functions and effects of this embodiment are described. According to this embodiment, the two first wires 15 arranged side by side in the first parallel portion 17 are electromagnetically shielded from the noise source located around the side wall portions 44 by the side wall portions 44 disposed around (laterally outwardly of) the first parallel portion 17. In this way, the noise resistance performance of the first UTP cable 11 can be improved.

Further, according to this embodiment, the two second wires 29 arranged side by side in the second parallel portion 31 are electromagnetically shielded from the noise source located around the side wall portions 44 by the side wall portions 44 disposed around (laterally outwardly of) the second parallel portion 31. In this way, the noise resistance performance of the second UTP cable 14 can be improved.

According to the shield member 43 disclosed in this specification, since the upper and lower openings 47, 48 are formed in the direction along the wall surfaces of the two side wall portions 44, the structure of the shield member 43 can be simplified. In this way, the shield member 43 can be reduced in weight as compared to the case where no opening is provided or only the upper opening 47 or only the lower opening 48 is provided. Further, the manufacturing cost of the shield member 43 can be reduced.

Further, according to this embodiment, the two side wall portions 44 are mirror-symmetrically formed with respect to the virtual plane 51 including the middle position between the two first wires 15 constituting the first parallel portion 17 in the lateral direction and extending along an extending direction of the two first wires 15. Similarly, the two side wall portions 44 are mirror-symmetrically formed with respect to the virtual plane 51 including the middle position between the two second wires 29 constituting the second parallel portion 31 in the lateral direction and extending along an extending direction of the two second wires 29.

According to the above configuration, the electromagnetic environment of the two first wires 15 constituting the first parallel portion 17 can be homogenized and the electromagnetic environment of the two second wires 29 constituting the second parallel portion 31 can be homogenized. In this way, the influence of noise emitted from the noise source on the first and second wires 15, 29 can be homogenized as compared to the case where the shield member 43 is not provided. The noise commonly given to the two first wires 15 is cancelled in a differential communication cable. Further, the noise commonly given to the two second wires 29 is cancelled in the differential communication cable.

Further, according to this embodiment, the front and rear connecting portions 45, 46 are integrally formed to the two side wall portions 44. According to the above configuration, the structure of the shield member 43 can be simplified, wherefore the manufacturing cost of the shield member 43 can be reduced.

Further, according to this embodiment, the two side wall portions 44 are located around the male terminals 18 connected to the first wires 15 and the female terminals 32 connected to the second wires 29. In this way, the influence of noise applied to the male terminals 18 and the female terminals 32 can be reduced.

The wiring harness 10 according to this embodiment includes the first UTP cable 11 formed by twisting the two first wires 15 and having the first parallel portion 17 in which the two first wires 15 are arranged side by side, the male terminals 18 respectively connected to the end parts of the first wires 15, the male connector 12 for accommodating the male terminals 18, the second UTP cable 14 formed by twisting the two second wires 29 and having the second parallel portion 31 in which the two second wires 29 are arranged side by side, the female terminals 32 respectively connected to the end parts of the second wires 29, the female connector 13 for accommodating the female terminals 32, and the shield member 43 having the two conductive side wall portions 44 disposed around the first wires 15 and the second wires 29 in the first and second parallel portions 17, 31 and the front and rear connecting portions 45, 46 connecting the two side wall portions 44. In this way, the noise resistance performance of the wiring harness 10 can be improved.

Further, according to this embodiment, the male connector 12 includes the fitting grooves 49 to which the shield member 43 is fixed. In this way, the structure of the wiring harness 10 can be simplified as compared to the case where the shield member 43 is fixed to a member different from the male connector 12.

Calculation Examples

Next, computer-simulated calculation examples, in which the functions and effects of this LCL (Longitudinal Conversion Loss) and embodiment were confirmed, are described. ANEXTDS (Alien Near End Cross conversion loss Single end to Differential) were calculated for Calculation Example 1, Calculation Example 2 and Calculation Example 3. The LCL is an index on unnecessary electrical noise (emission) released from an electrical device, and the ANEXTDS is an index on withstanding capability when the electrical device is exposed to an electrical stress (immunity). Calculation Example 1, Calculation Example 2 and Calculation Example 3 are described with reference to FIGS. 7A to 9. Note that the male connector 12 is not shown in FIGS. 7A to 9.

For the technique disclosed in this specification, Calculation Example 2 is an embodiment and Calculation Example 1 and Calculation Example 3 are comparative examples.

Calculation Example 1

Figure 7A:
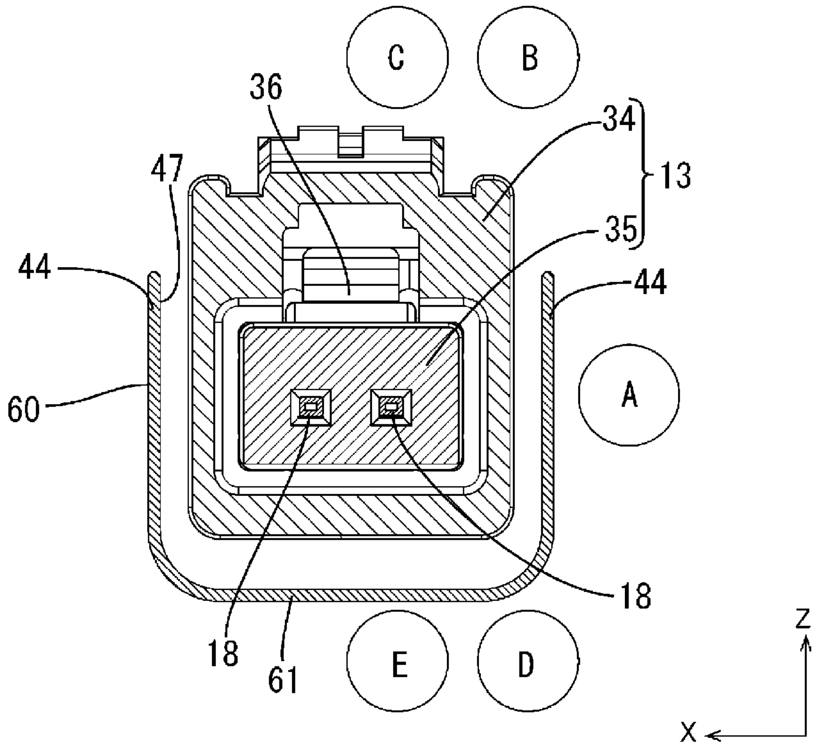
FIG. 7A is a schematic section showing the arrangement of a wire for Calculation Example 1.
Figure 7B:
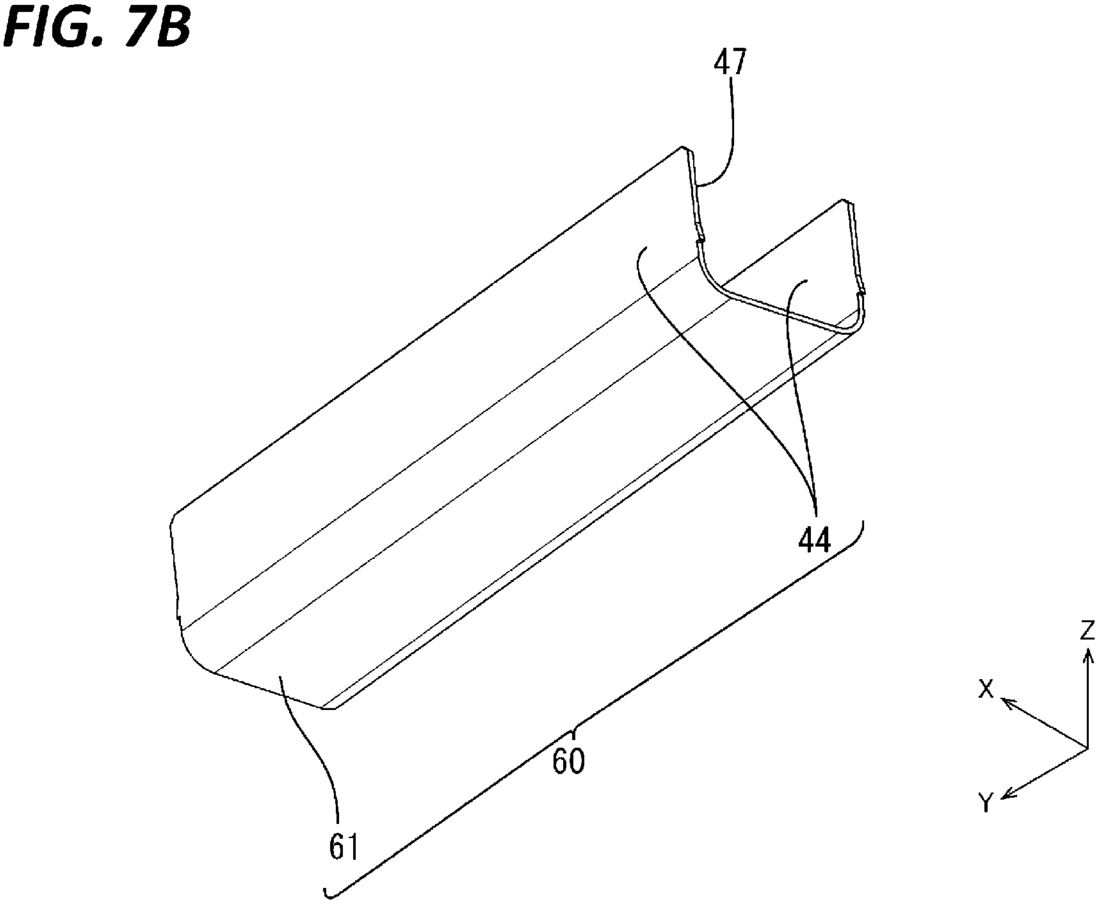
FIG. 7B is a perspective view showing a shield member for Calculation Example 1.

As shown in FIGS. 7A and 7B, the lower edges of two side wall portions 44 are electrically connected by a connecting portion 61 integrally formed to the two side wall portions 44 in a shield member 60 used in Calculation Example 1. The connecting portion 61 in Calculation Example 1 is not open in the vertical direction. Other components are similar to those of the first embodiment.

Calculation Example 2

Figure 8:
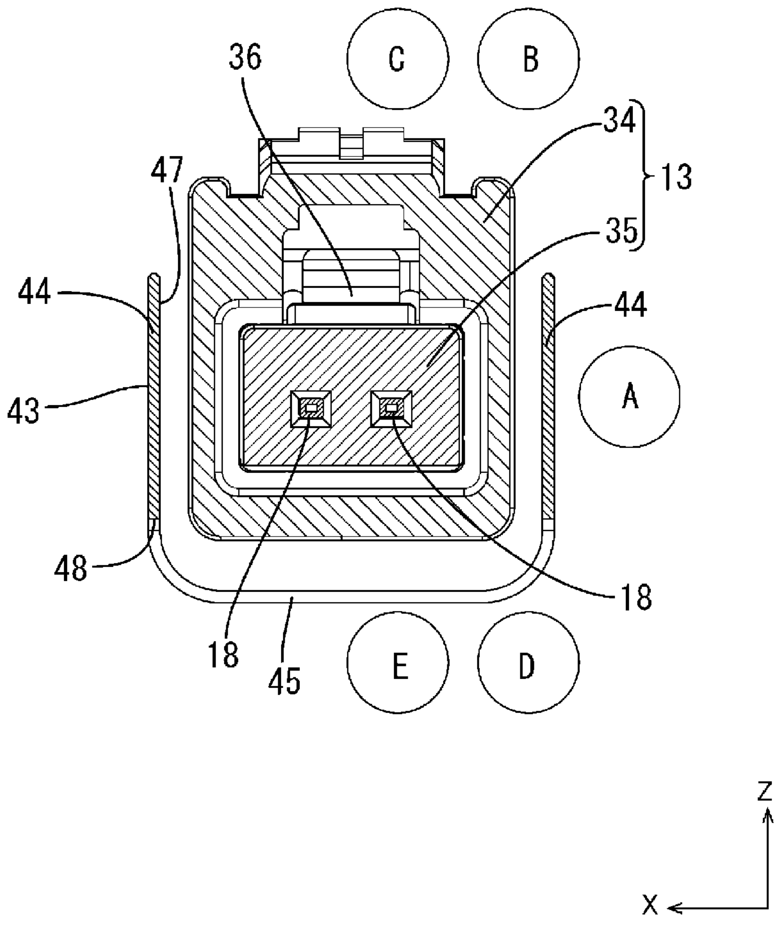
FIG. 8 is a schematic section showing the arrangement of the wire for Calculation Example 2.

As shown in FIGS. 6 and 8, the shield member 43 disclosed in the first embodiment was used in Calculation Example 2.

Calculation Example 3

Figure 9:
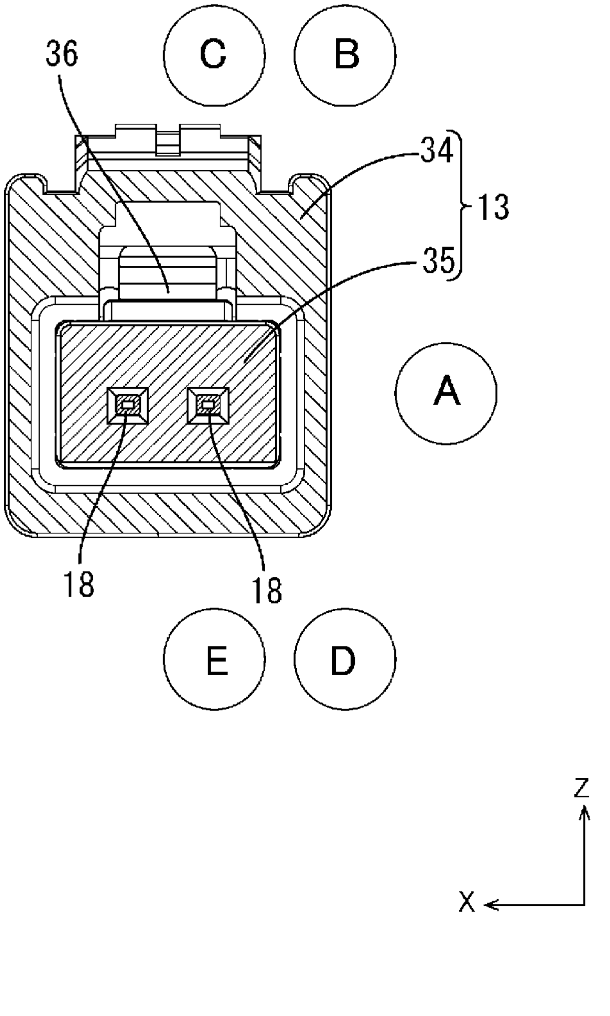
FIG. 9 is a schematic section showing the arrangement of the wire for Calculation Example 3.

As shown in FIG. 9, the male connector 12 having no shield member mounted thereon was used in Calculation Example 3. Other components are similar to those of the first embodiment.

Calculation Method

The LCL and the ANEXTDS in a state where one wire is arranged as a noise source along a wiring harness were calculated for Calculation Examples 1 to 3. As shown in FIGS. 7A to 9, five wire arrangement positions were set. The wire arrangement positions are as follows:

Position A: Leftward of the right side wall portion 44,

Position B: Upward of the right side wall portion 44,

Position C: Upward of the right wire and terminal,

Position D: Downward of the right side wall portion 44, and

Position E: Downward of the right wire and terminal.

In the calculation example (simulation), out of the UTP cables constituting a differential pair, a differential port 1 was assigned to the first UTP cable 11 and a differential port 2 was assigned to the second UTP cable 14. A single end port 3 was assigned to the rear end (end part on the side of the first UTP cable 11) of the wire 62 serving as the noise source, and a single end port 4 was assigned to the front end (end part on the side of the second UTP cable 14) of the wire 62 (see FIG. 2).

Since the LCL represents a ratio of an amount changed into a differential mode voltage when a common mode voltage is input to the UTP cables constituting the differential pair in decibel (dB), the LCL is a negative value. In this calculation example, the emission performance of the wiring harness becomes better as the value of the LCL becomes smaller.

Since the ANEXTDS represents a ratio of an amount of a differential mode voltage induced in the UTP cables constituting the differential pair when a single end voltage is input to the wire serving as the noise source in decibel (dB), the ANEXTDS is a negative value. In this calculation example, the immunity performance of the wiring harness becomes better as the value of the ANEXTDS becomes smaller.

[Results and Considerations]

[LCL]

1. Comparison of Calculation Examples 1, 2 and 3

Figure 10:
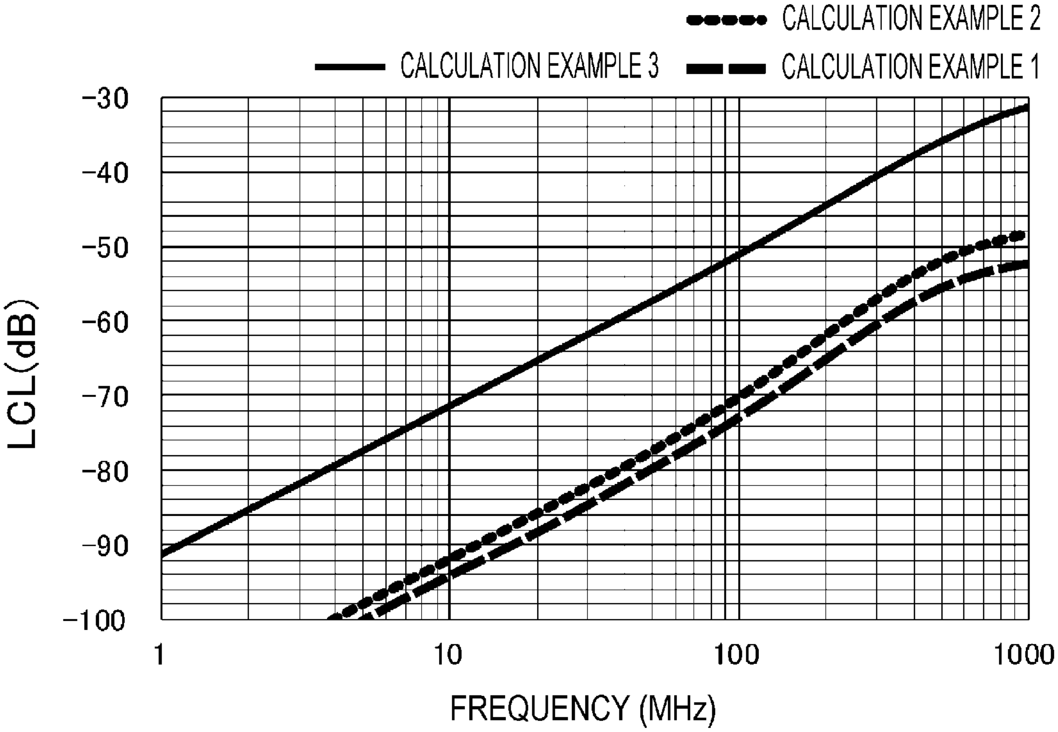
FIG. 10 is a graph showing changes of LCL in relation to a common mode frequency for Calculation Example 1 to Calculation Example 3.

FIG. 10 shows results of the LCL of Calculation Examples 1, 2 and 3 calculated when the wire was disposed at the position A. Although described later, the LCL increases most on the condition that the wire is disposed at the position A. Thus, the LCL when the wire was disposed at the position A is illustrated and described as a representative value for the comparison of the respective calculation examples.

The LCLs of Calculation Examples 1, 2 and 3 monotonously increased as a common mode frequency increased. The value of the LCL is largest in Calculation Example 3 and smaller in Calculation Examples 1 and 2 than in Calculation Example 3. The value of LCL was slightly smaller in Calculation Example 1 than in Calculation Example 2. Concerning emission, it was found that Calculation Examples 1 and 2 had substantially the same performance. Since the shield member 43 relating to Calculation Example 2 has the lower opening 48, the shield member 43 can be lighter in weight than the shield member 60 relating to Calculation Example 1 and having no opening.

The shield member 43 is not disposed in Calculation Example 3. Thus, if the wire serving as the noise source is disposed to the right of the two wires and terminals constituting the parallel portion, an electromagnetic environment of the two wires and terminals constituting the parallel portion becomes nonhomogeneous in the lateral direction. In this way, it is thought that the differential mode voltage increased and the LCL increased.

In contrast, the side wall portions 44 are respectively disposed laterally outwardly of the two wires and terminals constituting the parallel portion in Calculation Examples 1 and 2. In this way, an electromagnetic environment of the two wires and terminals constituting the parallel portion is homogenized as compared to the case where the shield member 43 is not disposed. As a result, it is thought that the differential mode voltage did not increase and the LCL decreased even if the wire serving as the noise source was disposed to the right of the two wires and terminals constituting the parallel portion.

The value of the LCL at a common mode frequency of 100 MHz was −73.0 dB in Calculation Example 1, −70.3 dB in Calculation Example 2 and −51.3 dB in Calculation Example 3. The emission performance was improved by 19.0 dB in Calculation Example 2 as compared to Calculation Example 3 and by 21.7 dB in Calculation Example 1 as compared to Calculation Example 3.

2. Concerning Calculation Example 3

Figure 11:
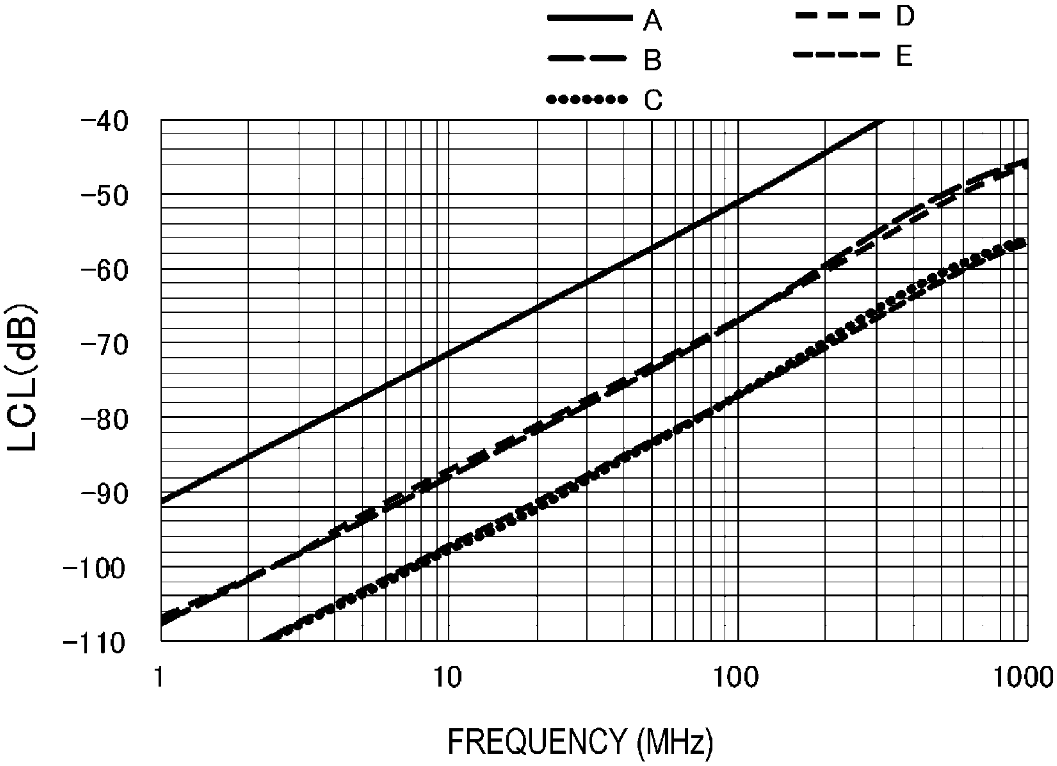
FIG. 11 is a graph showing changes of LCL in relation to the common mode frequency for Calculation Example 3.

As shown in FIG. 11, the LCL of Calculation Example 3 monotonously increased as the common mode frequency increased for the positions A, B, C, D and E. The LCL at the position A was largest, the LCLs at the positions B and D were second largest, and the LCLs at the positions C and E were smallest. The LCL at the position A is thought to be largest because the electromagnetic environment of the two wires and terminals constituting the parallel portion became nonhomogeneous in the lateral direction as described above.

3. Concerning Calculation Example 2

Figure 12:
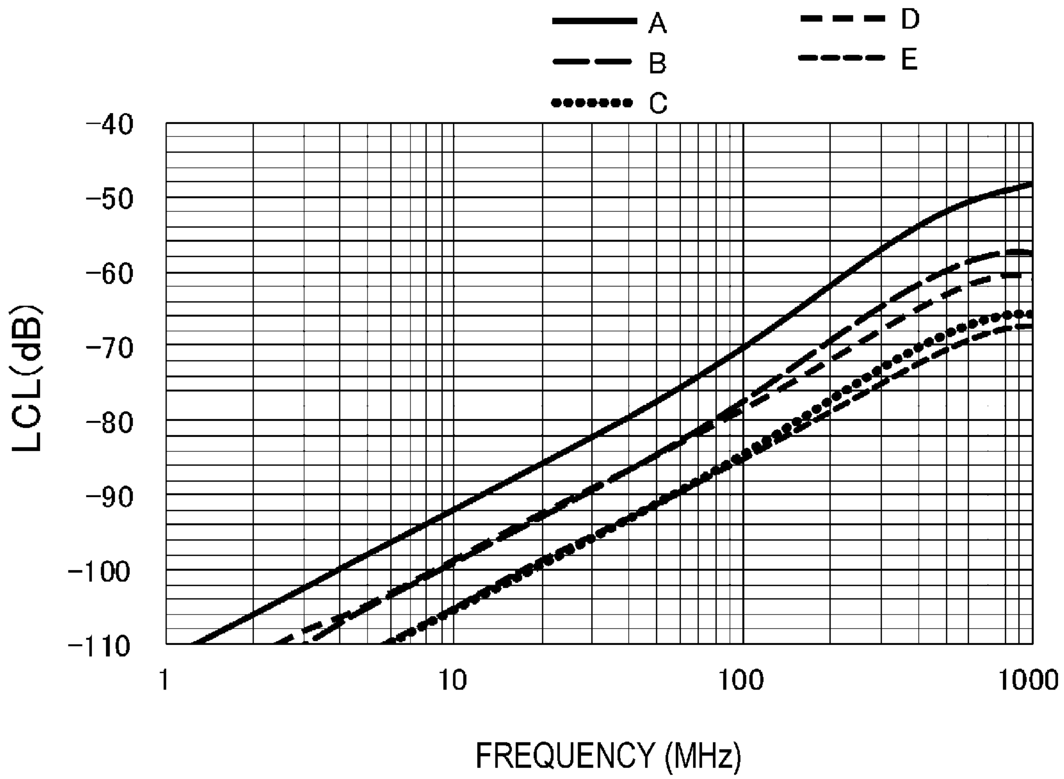
FIG. 12 is a graph showing changes of LCL in relation to the common mode frequency for Calculation Example 2.

As shown in FIG. 12, the LCL of Calculation Example 2 monotonously increased as the common mode frequency increased for the position A. The LCL showed a tendency to somewhat decrease in a range of the common mode frequency from 800 MHz to 1000 MHz for the positions B, C, D and E. The LCL at the position A was largest, the LCLs at the positions B and D were second largest, and the LCLs at the positions C and E were smallest. Since a magnitude relationship of the LCL at the respective positions is similar to that in Calculation Example 3 described above, it is not described.

4. Concerning Calculation Example 1

Figure 13:
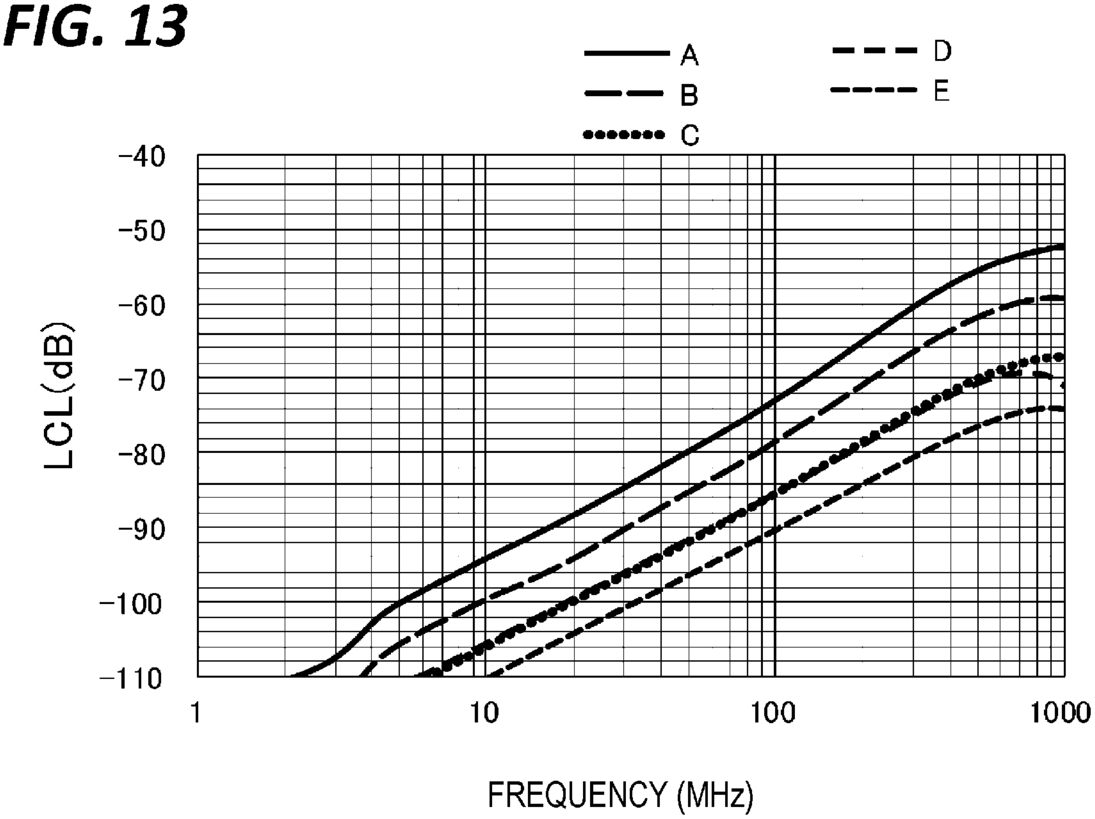
FIG. 13 is a graph showing changes of LCL in relation to the common mode frequency for Calculation Example 1.

As shown in FIG. 13, the LCL of Calculation Example 1 monotonously increased as the common mode frequency increased for the position A. The LCL showed a tendency to somewhat decrease in a range of the common mode frequency from 700 MHz to 1000 MHz for the positions B, C, D and E. The LCL at the position A was largest, the LCL at the position B was second largest, the LCLs at the positions C and D were third largest and the LCL at the position E was smallest.

ANEXTDS

1. Comparison of Calculation Examples 1, 2 and 3

Figure 14:
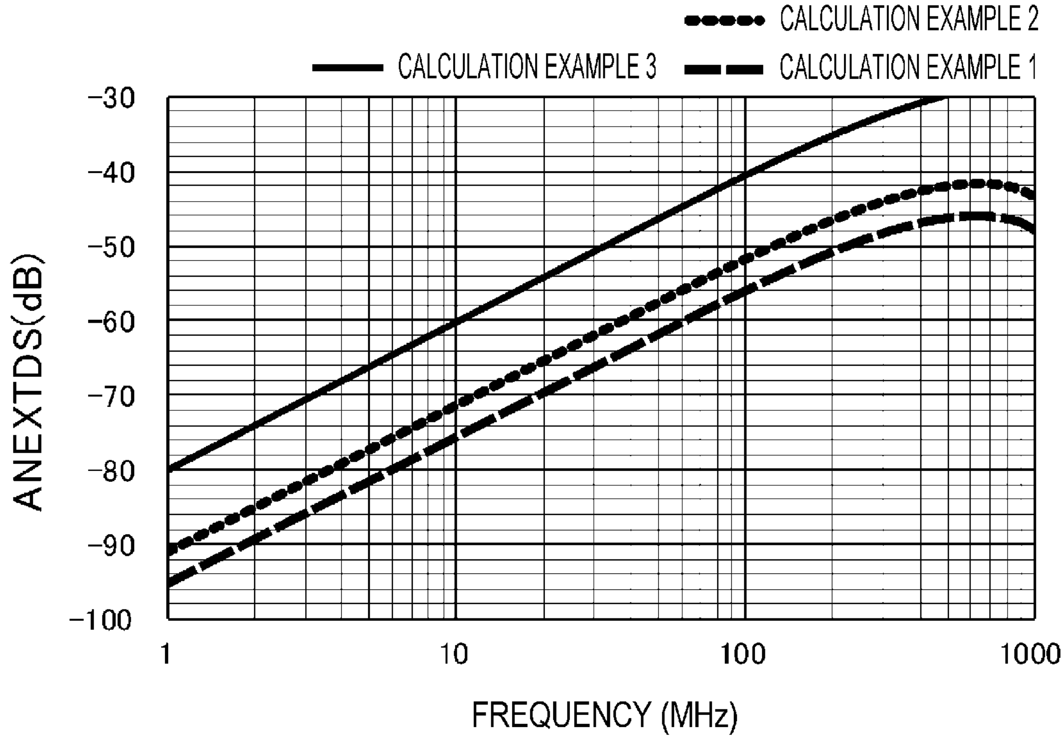
FIG. 14 is a graph showing changes of ANEXTDS in relation to a frequency of a noise source for Calculation Example 1 to Calculation Example 3.

FIG. 14 shows results of the ANEXTDS of Calculation Examples 1, 2 and 3 calculated when the wire was disposed at the position A. Although described later, the ANEXTDS increases most on the condition that the wire is disposed at the position A. Thus, the ANEXTDS when the wire was disposed at the position A is illustrated and described as a representative value for the comparison of the respective calculation examples.

The ANEXTDSs of Calculation Examples 1, 2 and 3 showed a tendency to substantially increase as a frequency of the noise source increased and showed a tendency to somewhat decrease in a frequency range of the noise source from 600 MHz to 1000 MHz. The value of the ANEXTDS is largest in Calculation Example 3 and smaller in Calculation Examples 1 and 2 than in Calculation Example 3. The value of the ANEXTDS was slightly smaller in Calculation Example 1 than in Calculation Example 2. Concerning immunity, it was found that Calculation Examples 2 and 1 had substantially the same performance. Since the shield member 43 relating to Calculation Example 2 has the lower opening 48 as described above, the shield member 43 can be lighter in weight than the shield member 60 relating to Calculation Example 1 and having no opening.

Since a magnitude relationship of the ANEXTDS of Calculation Examples 1, 2 and 3 can be thought to be similar to that of LCL described above, repeated description is omitted.

The value of the ANEXTDS at a frequency of the noise source of 100 MHz was −56.1 dB in Calculation Example 1, −51.8 dB in Calculation Example 2 and −40.7 dB in Calculation Example 3. The emission performance was improved by 11.1 dB in Calculation Example 2 as compared to Calculation Example 3 and by 15.4 dB in Calculation Example 1 as compared to Calculation Example 3.

2. Concerning Calculation Example 3

Figure 15:
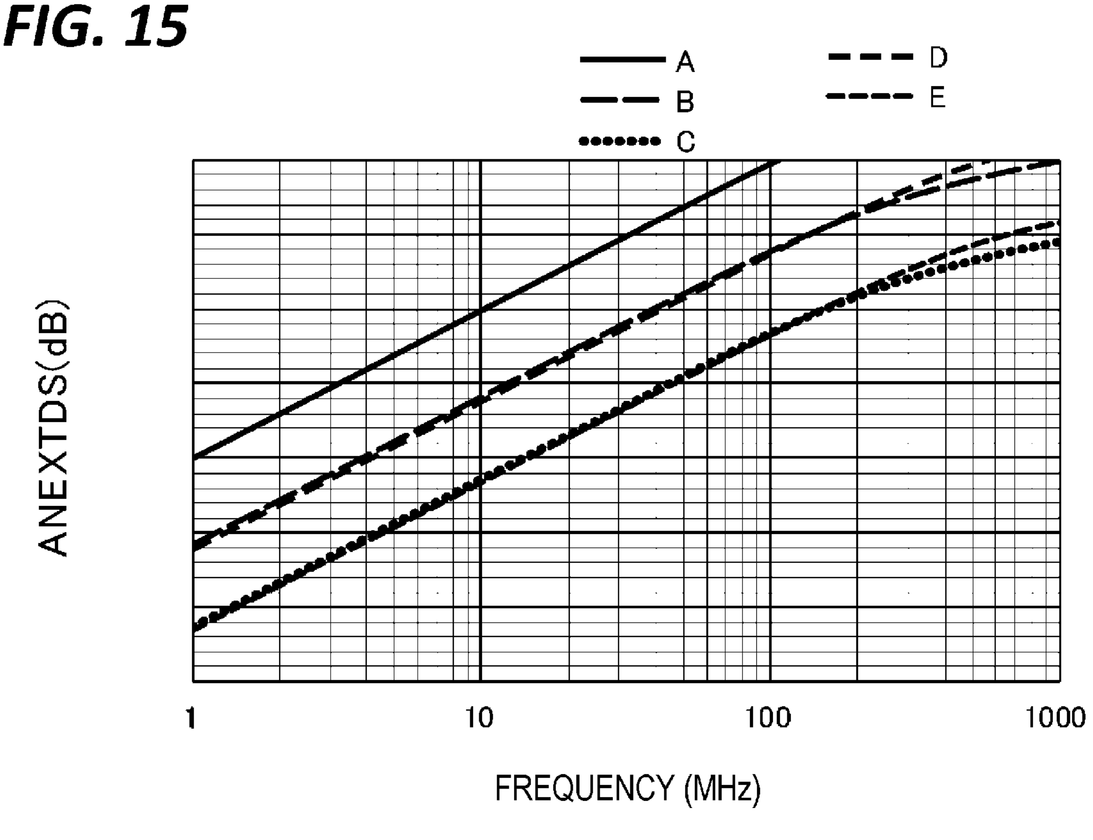
FIG. 15 is a graph showing changes of ANEXTDS in relation to the frequency of the noise source for Calculation Example 3.

As shown in FIG. 15, the ANEXTDS of Calculation Example 3 monotonously increased as the frequency of the noise source increased for the positions A, B, C, D and E. The ANEXTDS at the position A was largest, the ANEXTDSs at the positions B and D were second largest, and the ANEXTDSs at the positions C and E were smallest. Since a magnitude relationship of the ANEXTDS at the positions A, B, C, D and E can be thought to be similar to that of LCL described above, repeated description is omitted.

3. Concerning Calculation Example 2

Figure 16:
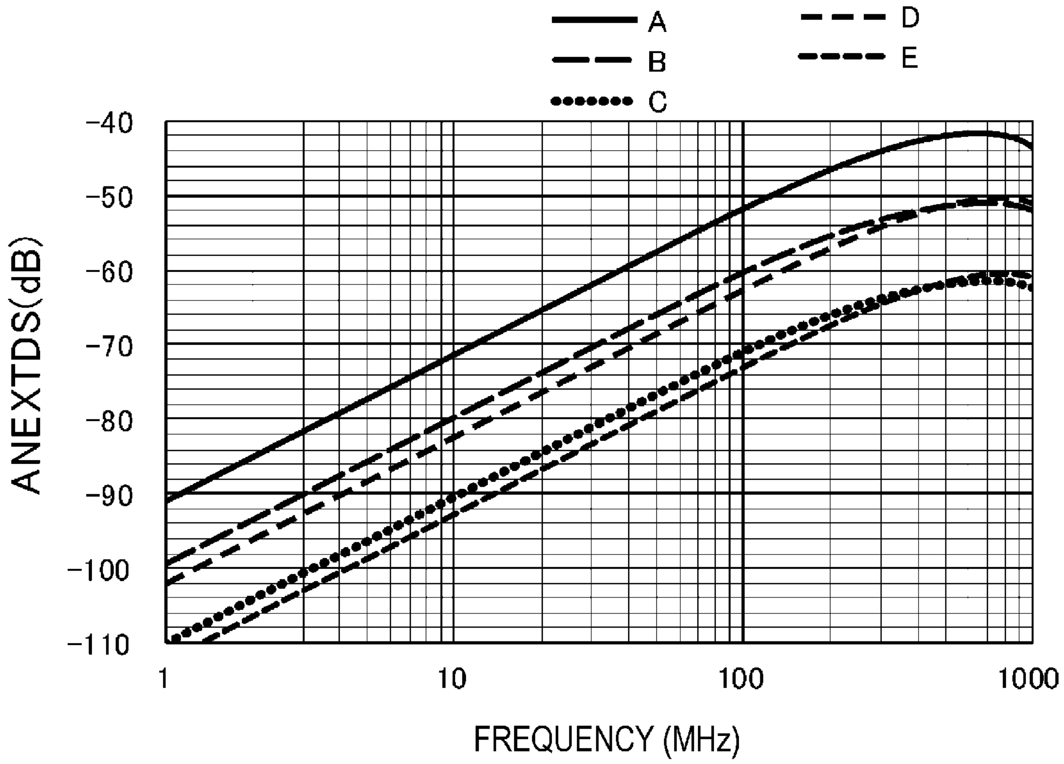
FIG. 16 is a graph showing changes of ANEXTDS in relation to the frequency of the noise source for Calculation Example 2.

As shown in FIG. 16, the ANEXTDS of Calculation Example 2 for the position A showed a tendency to increase as the frequency of the noise source increased and showed a tendency to somewhat decrease in a frequency range of the noise source from 600 MHz to 1000 MHz.

4. Concerning Calculation Example 1

Figure 17:
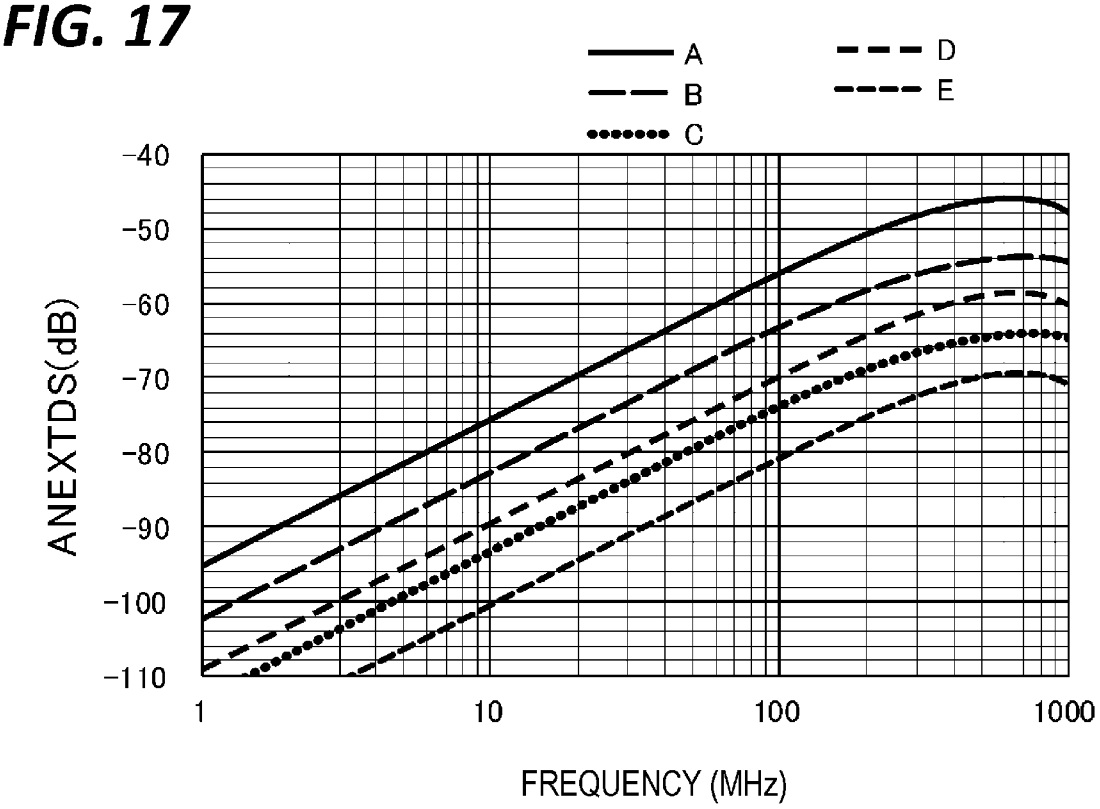
FIG. 17 is a graph showing changes of ANEXTDS in relation to the frequency of the noise source for Calculation Example 1.

As shown in FIG. 17, the ANEXTDS of Calculation Example 1 for the position A showed a tendency to increase as the frequency of the noise source increased and showed a tendency to decrease in a frequency range of the noise source from 700 MHz to 1000 MHz.

Second Embodiment

Figure 18:
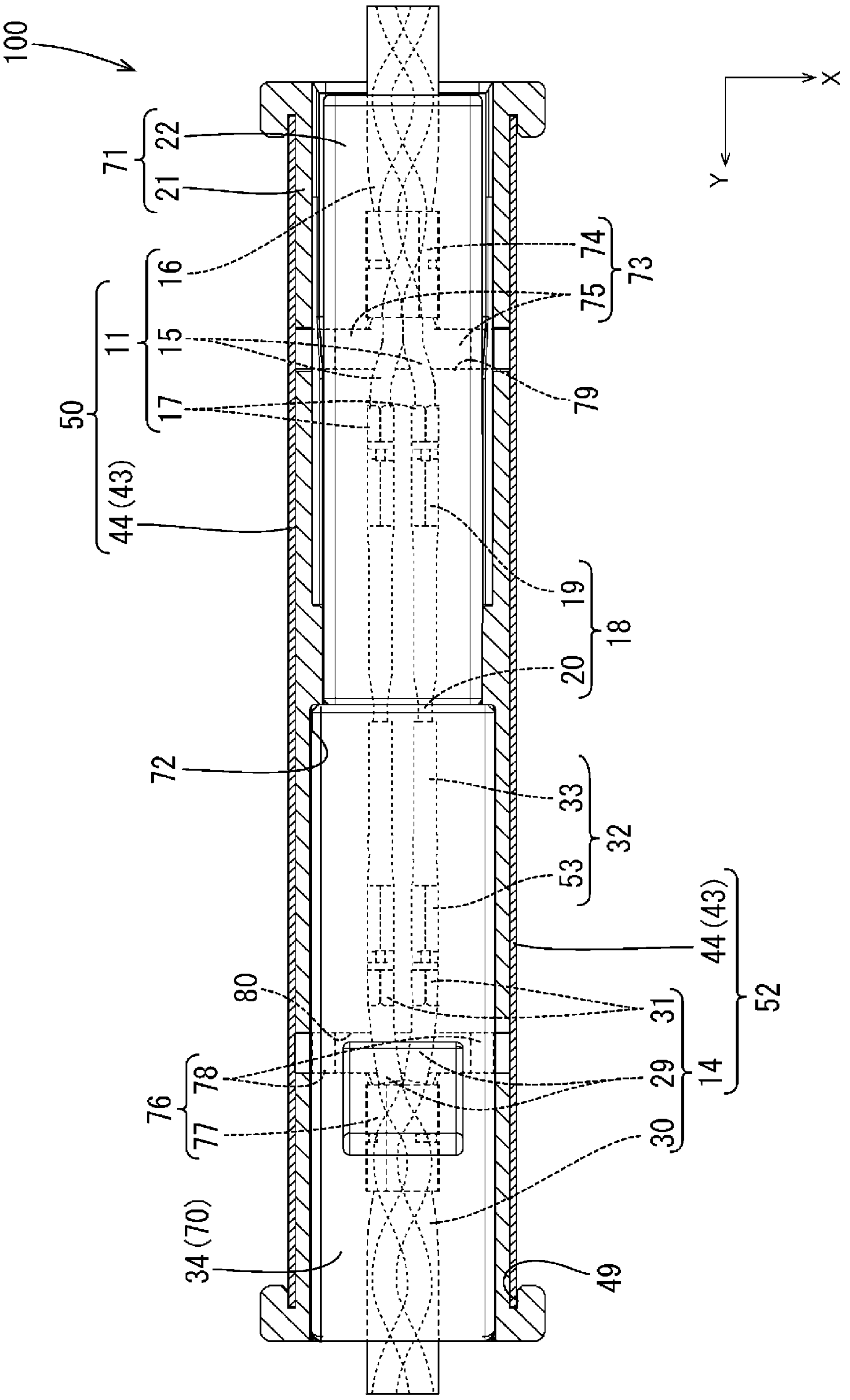
FIG. 18 is a section showing a wiring harness according to a second embodiment.

Next, a second embodiment of the present disclosure is described with reference to FIG. 18. In this embodiment, a female connector 70 is accommodated in a receptacle 72 of a male connector 71. In this way, a rear end part of a second sheath 30 of a second UTP cable 14 is located between two side wall portions 44.

[First Connecting Portion 73]

A first connecting portion 73 (an example of the connecting portion) is mounted at a position near an end part of a first sheath 16 of a first UTP cable 11. The first connecting portion 73 is formed by press-working a conductive metal plate material into a predetermined shape. The first connecting portion 73 has an annular shape and includes a first externally fitting portion 74 (an example of an externally fitting portion) to be externally fit at the position near the end part of the first sheath 16 and a first extending portion 75 (an example of an extending portion) connected to the first externally fitting portion 74 and extending in the lateral direction. The first extending portion 75 is in the form of an elongated plate extending leftward and rightward. Tip parts of the first extending portion 75 are folded inwardly in the lateral direction.

[Second Connecting Portion 76]

A second connecting portion 76 (an example of the connecting portion) is mounted at a position near an end part of the second sheath 30 of the second UTP cable 14. The second connecting portion 76 includes a second externally fitting portion 77 (an example of the externally fitting portion) and a second extending portion 78 (an example of the extending portion). Since the second connecting portion 76 has the same shape and size as the first connecting portion 73, repeated description is omitted.

[Male Connector 71]

With male terminals 18 accommodated in a male inner housing 22, a first insertion window 79 penetrates through the male connector 71 at a position corresponding to the first extending portion 75 of the first connecting portion 73. The first extending portion 75 is inserted into this first insertion window 79. The tip parts of the first extending portion 75 inserted into the first insertion window 79 contact two side wall portions 44 from inside in the lateral direction. In this way, the two side wall portions 44 are electrically connected by the first connecting portion 73.

[Female Connector 70]

With female terminals 32 accommodated in a female inner housing 35, a second insertion window 80 penetrates through the female connector 70 at a position corresponding to the second extending portion 78 of the second connecting portion 76. The second extending portion 78 is inserted into this second insertion window 80. Tip parts of the second extending portion 78 inserted into the second insertion window 80 contact the two side wall portions 44 from inside in the lateral direction. In this way, the two side wall portions 44 are electrically connected by the second connecting portion 76.

Since the other configuration is substantially the same as in the first embodiment, the same components are denoted by the same reference signs and repeated description is omitted.

According to this embodiment, parts of first wires 15 exposed from the end part of the first sheath 16 collectively surrounding the first wires 15 constitute a first parallel portion 17, and the first connecting portion 73 includes the first externally fitting portion 74 externally fit to the end part of the first sheath 16 and the first extending portion 75 extending in the lateral direction from the first externally fitting portion 74 and configured to contact the two side wall portions 44.

Further, parts of second wires 29 exposed from the end part of the second sheath 30 collectively surrounding the second wires 29 constitute a second parallel portion 31, and the second connecting portion 76 includes the second externally fitting portion 77 externally fit to the end part of the second sheath 30 and the second extending portion 78 extending in the lateral direction from the second externally fitting portion 77 and configured to contact the two side wall portions 44.

According to the above configuration, the untwisting of the two first wires 15 located in the first sheath 16 can be suppressed by externally fitting the first externally fitting portion 74 to the end part of the first sheath 16. Similarly, the untwisting of the two second wires 29 located in the second sheath 30 can be suppressed by externally fitting the second externally fitting portion 77 to the end part of the second sheath 30.

Further, since a member for suppressing the untwisting of the two first wires 15 can be used to electrically connect the two side wall portions 44, the number of components can be reduced. Similarly, since a member for suppressing the untwisting of the two second wires 29 can be used to electrically connect the two side wall portions 44, the number of components can be reduced. In this way, the manufacturing cost of a wiring harness 10 and shield structures 50, 52 can be reduced.

Third Embodiment

Figure 19:
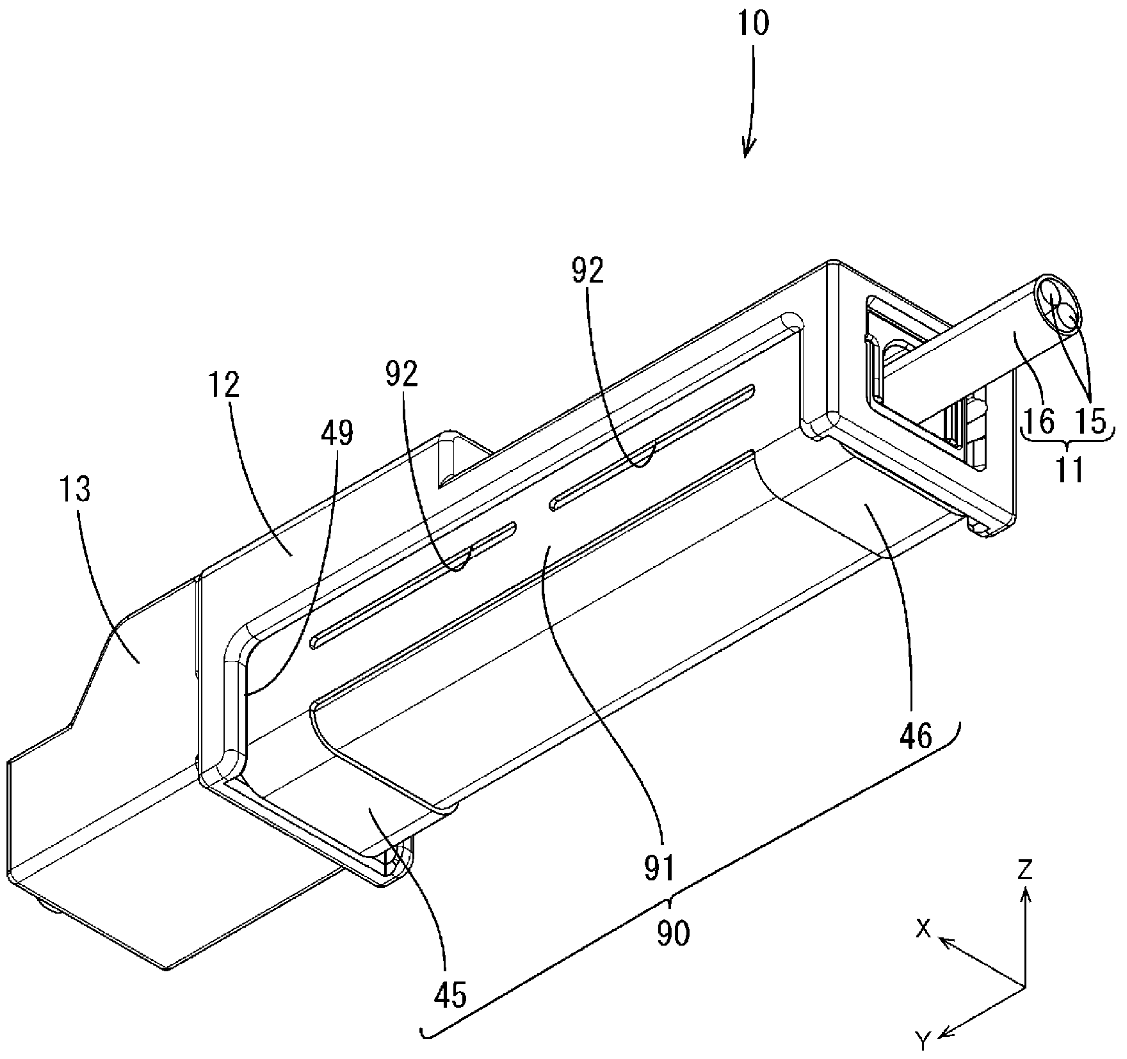
FIG. 19 is a perspective view showing a wiring harness according to a third embodiment.

Next, a third embodiment of the present disclosure is described with reference to FIG. 19. In this embodiment, each of two side walls 91 of a shield member 90 includes two slits 92 extending in the front-rear direction and spaced apart. The slits 92 are formed near a center of the side wall 91 in the vertical direction. The two slits 92 have an equal length in the front-rear direction.

Since the other configuration is substantially the same as in the first embodiment, the same components are denoted by the same reference signs and repeated description is omitted.

According to the above configuration, the shield member 90 can be reduced in weight. Further, by providing a male connector 12 with members to be fit into the slits 92, the shield member 90 can be reliably fixed to the male connector 12.

Other Embodiments

The present disclosure is not limited to the above described and illustrated embodiments. For example, the following embodiments are also included in the technical scope of the technique disclosed in this specification.

(1) The shield member may be open only on the upper side or may be open only on the lower side.

(2) The two side wall portions 44 may not be mirror-symmetric with respect to the virtual plane 51.

(3) The connecting portions for electrically connecting the two side wall portions 44 may be configured to connect the upper edge parts of the two side wall portions 44 in the front end parts of the two side wall portions 44 and connect the lower edge parts in the rear end parts or may be configured to connect the two side wall portions 44 near a vertical center in the front and rear end parts of the two side wall portions 44. The two side wall portions 44 can be connected at arbitrary positions in the vertical direction.

(4) Although the shield member 43 is externally fit to the male connector 12, there is no limitation to this and the shield member 43 may be fit into a male cavity of the male connector 12.

(5) A shield member may be applied to a parallel portion of a twisted pair cable including no terminal.

(6) The shield member 43 may be mounted on a member different from the male connector 12.

(7) The shield member 43 may be formed by an arbitrary method such as welding, cutting or casting.

LIST OF REFERENCE NUMERALS

10: wiring harness
11: first UTP cable
12: male connector
13: female connector
14: second UTP cable
15: first wire
16: first sheath
17: first parallel portion
18: male terminal
19: wire connecting portion
20: male tab
21: male outer housing
22: male inner housing
23: receptacle
24: male locking lance
29: second wire
30: second sheath
31: second parallel portion
32: female terminal
33: connecting tube portion
34: female outer housing
35: female inner housing
36: female locking lance
41: lock arm
42: lock portion
43: shield member
44: side wall portion
45: front connecting portion
46: rear connecting portion
47: upper opening
48: lower opening
49: fitting groove
50: shield structure
51: virtual plane
52: shield structure
53: wire connecting portion
60: shield member
61: connecting portion

62: wire
70: female connector
71: male connector
72: receptacle
73: first connecting portion
74: first externally fitting portion
75: first extending portion
76: second connecting portion
77: second externally fitting portion
78: second extending portion
79: first insertion window
80: second insertion window
90: shield member
91: side wall
92: slit

What is claimed is:

1. A shield structure, comprising:

a UTP cable formed by twisting two wires and including a parallel portion, the two wires being arranged side by side in the parallel portion; and a shield member including two conductive side wall portions disposed around the parallel portion and outwardly of the parallel portion in an arrangement direction of the two wires and two connecting portions configured to electrically connect the two side wall portions, the two connecting portions being respectively disposed on front end parts and rear end parts in an extending direction of the parallel portion, out of the two side wall portions, and the two side wall portions being mirror-symmetrically formed with respect to a virtual plane including a middle position between the two wires constituting the parallel portion and extending along an extending direction of the two wires, wherein the shield member includes an upper opening that opens upwardly and is formed by upper edge parts of the two side wall portions and a lower opening that opens downwardly is formed by a region surrounded by lower edge parts of the two side wall portions and edge parts of the two connecting portions.

2. The shield structure of claim 1, wherein the connecting portions are integrally formed to the two side wall portions.

3. The shield structure of claim 1, wherein the two side wall portions are located around two terminals connected to respective end parts of the two wires constituting the parallel portion.

4. The shield structure of claim 1, wherein:

parts of the two wires exposed from an end part of a sheath collectively surrounding the two wires constitute the parallel portion, and the connecting portions include externally fitting portions externally fit to the end part of the sheath and extending portions extending from the externally fitting portions and configured to contact the two side wall portions.

5. A wiring harness, comprising:

a UTP cable formed by twisting two wires and including a parallel portion, the two wires being arranged side by side in the parallel portion;

two terminals respectively connected to end parts of the two wires constituting the parallel portion;

a connector configured to accommodate the two terminals; and a shield member including two conductive side wall portions disposed around the parallel portion and outwardly of the parallel portion in an arrangement direction of the two wires and two connecting portions configured to electrically connect the two side wall portions, the two connecting portions being respectively disposed on front end parts and rear end parts in an extending direction of the parallel portion, out of the two side wall portions, and the two side wall portions being mirror-symmetrically formed with respect to a virtual plane including a middle position between the two wires constituting the parallel portion and extending along an extending direction of the two wires, wherein the shield member includes an upper opening that opens upwardly and is formed by upper edge parts of the two side wall portions and a lower opening that opens downwardly is formed by a region surrounded by lower edge parts of the two side wall portions and edge parts of the two connecting portions.

6. The wiring harness of claim 5, wherein the connector includes a fixing portion, the shield member being fixed to the fixing portion.

* * * * *